US012664425B2

(12) United States Patent
Veranyurt et al.

(10) Patent No.: US 12,664,425 B2
(45) Date of Patent: Jun. 23, 2026

---

(54) METHOD FOR DETECTION OF AN OBJECT

(71) Applicant: BAHCESEHIR UNIVERSITESI, Istanbul (TR)

(72) Inventors: Ozan Veranyurt, Istanbul (TR); Cemal Okan Sakar, Istanbul (TR)

(73) Assignee: BAHCESEHIR UNIVERSITESI, Besiktas/Istanbul (TR)

( * ) Notice: Subject to any disclaimer, the term of this patent is extended or adjusted under 35 U.S.C. 154(b) by 776 days.

(21) Appl. No.: 18/025,346

(22) PCT Filed: Aug. 13, 2021

(86) PCT No.: PCT/TR2021/050801
§ 371 (c)(1),
(2) Date: Mar. 8, 2023

(87) PCT Pub. No.: WO2022/055451
PCT Pub. Date: Mar. 17, 2022

(65) Prior Publication Data
US 2023/0325660 A1      Oct. 12, 2023

(30) Foreign Application Priority Data

Sep. 9, 2020      (TR) ................................. 2020/14269

(51) Int. Cl.
*G06N 3/08*          (2023.01)
*G06N 3/0464*      (2023.01)
(Continued)

(52) U.S. Cl.
CPC ............. *G06N 3/08* (2013.01); *G06N 3/0464* (2023.01); *G06T 11/00* (2013.01); *G06V 10/235* (2022.01);
(Continued)

(58) Field of Classification Search
CPC ........ G06N 3/08; G06N 3/0464; G06T 11/00; G06T 10/22; G06T 10/776; G06T 10/82; G06T 10/94; G08B 21/02
See application file for complete search history.

(56) References Cited

U.S. PATENT DOCUMENTS

| | | | | |
|---|---|---|---|---|
| 8,437,556 | B1 * | 5/2013 | Saisan .................. | G06V 40/172 |
| | | | | 382/199 |
| 10,514,837 | B1 * | 12/2019 | Li ......................... | G06F 3/0482 |

(Continued)

OTHER PUBLICATIONS

Perkins, SID, Heating up the Search for Hidden Weapons, 5 pages, May 25, 2018 (Year: 2018).*

(Continued)

*Primary Examiner* — Barbara M Level
(74) *Attorney, Agent, or Firm* — RAPHAEL BELLUM PLLC

(57) ABSTRACT

The present invention relates to a real time method for detection of an object that enables to define, by means of a thermal camera, objects that are in the possession of people. The present invention particularly relates to a method that enables the detection of objects that are in the possession of people, through different deep learning methods that are subbranches of artificial intelligence using thermal camera images, wherein the images obtained via thermal cameras are processed real time and input into two different deep learning models.

6 Claims, 1 Drawing Sheet

(51) Int. Cl.

| | |
|---|---|
| *G06T 11/00* | (2006.01) |
| *G06V 10/22* | (2022.01) |
| *G06V 10/776* | (2022.01) |
| *G06V 10/82* | (2022.01) |
| *G06V 10/94* | (2022.01) |
| *G08B 21/02* | (2006.01) |

(52) U.S. Cl.

CPC ............ *G06V 10/776* (2022.01); *G06V 10/82* (2022.01); *G06V 10/95* (2022.01); *G08B 21/02* (2013.01)

(56) References Cited

U.S. PATENT DOCUMENTS

| | | | |
|---|---|---|---|
| 11,231,498 B1* | 1/2022 | Valdes Garcia | ........ G01S 7/411 |
| 2008/0144885 A1* | 6/2008 | Zucherman | .......... G06V 40/103 |
| | | | 382/103 |
| 2009/0041293 A1* | 2/2009 | Andrew | ................. H04N 5/272 |
| | | | 348/262 |
| 2016/0019427 A1* | 1/2016 | Martin | ................... G06V 40/10 |
| | | | 382/103 |
| 2019/0347518 A1* | 11/2019 | Shrestha | ................ G06V 20/52 |
| 2020/0242750 A1* | 7/2020 | Kokkula | .................. G06N 3/08 |
| 2020/0389624 A1* | 12/2020 | Oberholzer | .............. H04N 7/18 |
| 2021/0027471 A1* | 1/2021 | Cohen | ....................... G06N 3/08 |
| 2021/0158685 A1* | 5/2021 | Bernotas | ................ G08B 17/12 |
| 2022/0036131 A1* | 2/2022 | Chang | ....................... G06N 3/08 |
| 2022/0148397 A1* | 5/2022 | Schoeman | .......... H04L 12/2823 |

OTHER PUBLICATIONS

Raturi, Gaurav et al., "ADoCW: An Automated method for Detection of Concealed Weapon", 2019 Fifth International Conference on Image Information Processing (ICIIPO (Year: 2019).*

Marcin Kowalski, "Real-time concealed object detection and recognition in passive imaging at 250 GHz," Appl. Opt. 58, 3134-3140 (2019) (Year: 2019).*

Mithun, N C, et al. CN 111712830 A, filed Feb. 19, 2019, Application No. 201980014310 A (Year: 2019).*

International Search Report dated Dec. 14, 2021 for PCT International Application No. PCT/TR2021/050801 filed Aug. 13, 2021.

Hussein et al., "Multisensor of thermal and visual images to detect concealed weapon using harmony search image fusion approach"; 2016 Elsevier Ltd, Pattern Recognition Letters; Dec. 18, 2016; pp. 219-227.

Kanehisa et al., Firearm Detection using Convolutional Neural Networks; DOI: 10.5220/0007397707070714. pp. 707-714; 2019.

* cited by examiner

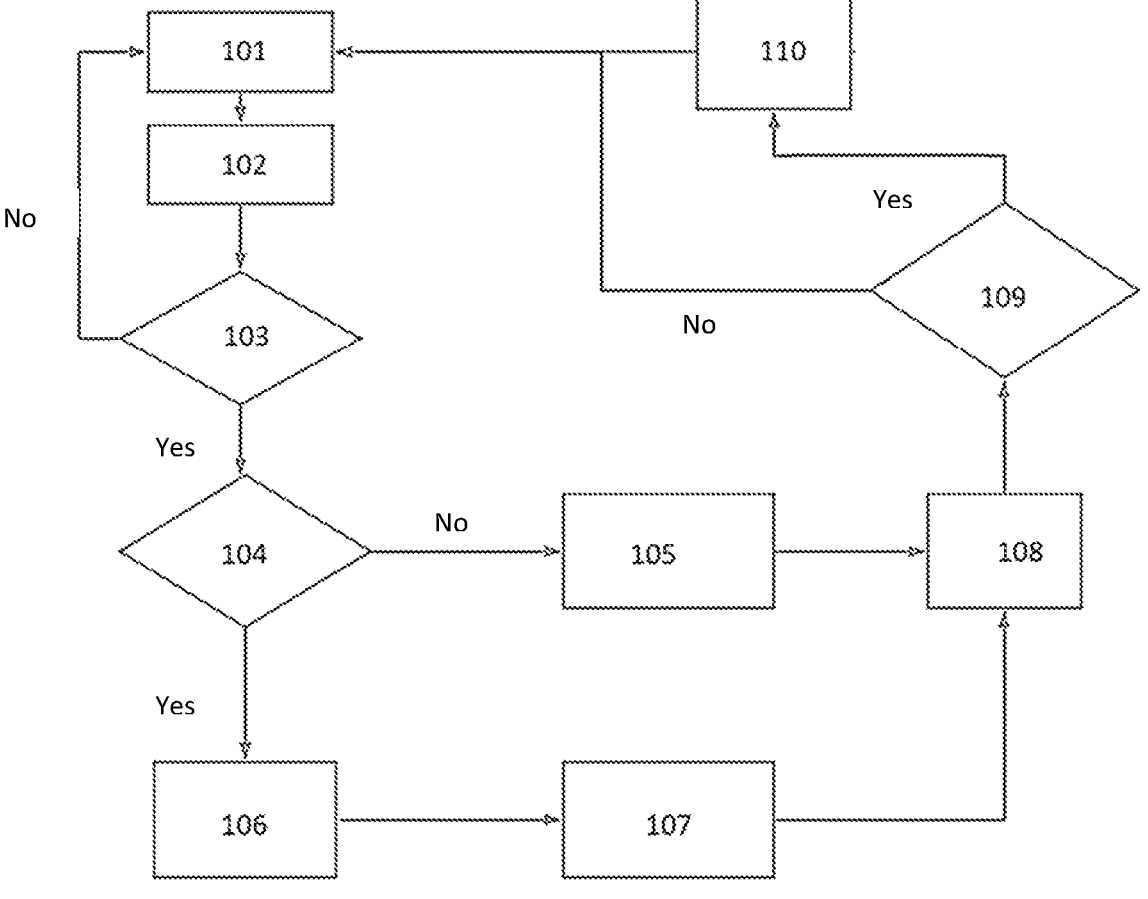

METHOD FOR DETECTION OF AN OBJECT

TECHNICAL FIELD OF THE INVENTION

The present invention relates to a real time method for detection of an object that enables to define, by means of a thermal camera, objects that are in the possession of people.

The present invention particularly relates to a method that enables the detection of objects that are in the possession of people, through different deep learning methods that are sub branches of artificial intelligence using thermal camera images, wherein the images obtained via thermal cameras are processed real time and input into two different deep learning models.

STATE OF THE ART

Nowadays crimes that are committed using firearms have increased and it is critical to detect rapidly, factors that threaten security. The present security solutions necessitate 7/24 human surveillance.

The solutions utilized are based on the detection of a metal object in the possession of a person using devices such as a metal detector, electromagnetic field detection devices, x-rays, and variable wavelength rays. These devices are computer-supported devices, and they necessitate continuous human surveillance in order to detect a dangerous object.

Different alarm metrics can be determined and produced if there is a metal object in the possession of a person by means of integrating a camera with an x-ray device. This is also a solution that necessitates continuous human surveillance.

A detector device operating with a conceptual microwave technology detects dangerous objects by transmitting signals at certain frequency ranges and comparing the responses received with the response information obtained from different metal objects within a database that has been previously formed.

Microwave is a device that aims to detect metal objects that have been concealed under clothing, using frequency ranges (100 Ghz-300 GHz). The device used in the solution, utilizes a satellite dish in order to produce signals and it generates images from the responses received by sending regular signals.

The patent file numbered "WO2008127360" in the state of the art has been examined. The invention subject to the application describes a thermal imaging device that incorporates multiple sensors such as millimeter wavelength sensors and terahertz sensors into a comprehensive architecture in order to detect various products such as improvised explosive devices. This invention detects concealed threats using an electromagnetic spectrum, based on the signals submitted by different sensors to the body and their responses. The invention can generally detect objects that may be a threat, that are being carried by a person.

The patent files numbered "US2018232581" and "US2015181136" in the state of the art have been examined. The inventions subject to the application are related with systems and detection methods that are used to detect the presence of concealed objects. In these patents, contour mapping, which is a relatively old method, is used for image processing. When the patent documents are examined, it can be perceived that a deep learning method is not used for the detection of dangerous objects. A step such as determining if the object is a person or not is present prior to examining the suggested image.

The patent file numbered "US20090041293" in the state art has been examined. In the invention subject to the application an imaging system that is used to detect concealed objects on a person is described. The invention comprises detecting an object concealed on a person by sensing the differences in the millimeter wave energy that is reflected by a person. The system subject of the invention carries out measurements with multiple sensors and a camera using millimeter wave (mmWave) energy. The mmWave band spectrum is also used in studies of 5G networks. Therefore, in the case of active 5G usage, it is risky to perform procedures at similar frequencies. In this invention an mmWave based camera has been used and live image broadcasting has been obtained by combining the images taken from said camera.

The patent file numbered "WO2008010832" in the state of the art has been examined. In the invention subject to the application a system which enables to detect on the background of a medium such as a human body, an explosive material concealed on the body of a person is described wherein said detection is based on the differential emission between objects that are not explosive and explosive agents such as a synthetic personal object. In this invention suspicious object detection is carried out by means of thermal emission levels. Threats are determined under human surveillance.

The patent file numbered "US20160223666" in the state of the art has been examined. In the invention subject to the application a concealed object detection system is described. This system comprises an RF module that enables to distribute RF energy towards the target by an emitter. According to the invention a scattered RF energy that has been reflected from the target is received by a receiver and a signal that corresponds to the received scattered RF energy is generated and each of the signals are compared with a processor that has a stored RF scatter signature that is connected with the object.

The patent file numbered "2017/06131" in the state of the art has been examined. According to the abstract section of the invention subject to the application "the invention is related to a wearable object detection system that enables to detect objects, that has face recognition properties and that can produce audio warning signals. The invention is particularly related to an object detection system that is in the form of glasses, that detects the natural vibration frequencies that are emitted by objects inside appliances and other similar containers, located on individuals, that defines an object using infrared (IR) sensors, radio frequency (RF) sensors and GHz sensors and that can warn the user with an audio, visual or touch warning". Said invention can only perform detection, using RF and IR signals. In this case only RF signals are used.

The patent file numbered "2017/19577" in the state of the art has been examined. In the abstract section of the invention subject to the application, the information presented is as follows; "the invention is particularly related to a system that enables the detection of bombs by creating radioactive areas using X rays and by taking X-rays of the targeted area and allowing analysis of the desired location via an observation unit".

All of the systems used in the state of the art necessitate usage under human supervision and surveillance. As these solutions require continuous human supervision said solutions are also open to human induced errors.

In the systems used in the state of the art applications that are utilized are body search, x-ray, detectors, and canine search. The most important problem posed by these applications is that direct contact is required with a person during such searches.

One of the most basic problems regarding security solutions used in the state of the art is that said solutions necessitate human supervision. A person needs to continuously survey the security cameras and said person needs to warn the related units if an image containing a threat is observed.

As the solutions used in the state of the art require processes such as an x-ray, magnetic field scanning, and microwave signal transmission, such processes pose a risk to human health as the person is subjected to continuous rays and radio waves. Detection using such solutions is not possible as these types of products cannot be used on risk groups such as people that have heart diseases or women that are pregnant.

Consequently, the disadvantages disclosed above and the inadequacy of available solutions in this regard necessitated making an improvement in the relevant technical field.

Objects of the Invention

The most important object of the present invention is to ensure the detection of a concealed object without human control by entering the thermal camera images into two deep learning modules. By this means, as the deep learning modules that are used to detect firearms can be continuously updated, different possibilities can always be used to train the model and the system can be continuously improved.

Another object of the present invention is that it can optimize the results it will obtain and provide sensitivity in different environments as its susceptibility can be parametrically adjusted in terms of detection.

Yet another object of the present invention is that it can perform detection of a concealed object without leading to any kind of health risk. By this means it can detect a concealed object without having to transmit a signal to the body or without using any sensors. The detection of the type of the concealed product differs with detection through deep learning and detection with only a thermal camera.

Yet another object of the present invention is to ensure that the deep learning models are provided as a mobile solution through the usage of a mobile application and a mobile thermal camera.

Yet another object of the present invention is to ensure that it does not necessitate continuous human supervision as the system is fully automated.

Yet another object of the present invention is for the deep learning models that detect the firearm and its location to be trained with individually obtained thermal image sets and to incorporate said deep learning models to the solution.

Yet another object of the present invention is to ensure that it can operate with all computers having a graphic processor and thermal camera integration. By this means the system can be used as a mobile system.

Yet another object of the present invention is to provide a more successful security system by automating weapon detection in critically important institutions (banks, government institutions, airports etc.). In this way the system subject to the invention has a structure that can be used as a pre-inspection system in order for warning/informing law enforcement officers by integrating said system with security systems.

Yet another object of the present invention is to enable the detection, without human supervision, of an object concealed on the human body using a computer. As a result the description of the object concealed on the body of a human can be notified directly to the related unit.

Yet another object of the present invention is to enable the detection, by artificial intelligence and an additional deep learning model, of an object concealed on the human body or an object in the possession of a person.

As a difference from the thermal radiation detection solution, another object of the present invention is to process the thermal matrix image by artificial intelligence, using a single camera. As a result, as the used thermal camera solution is a single camera, a device such as an additional thermal control etc. is not required.

Another object of the present invention is to provide options for institution using said system and to provide a more effective usage, by being able to detect what sort of object is being concealed by the person configuratively or by being able to determine the location of the concealed object.

Yet another object of the present invention is to provide a configurative alarm/detection mechanism by operating independently or parallel with two different deep learning models. By means of this structure object type detection/location determination and sensitivity can be adjusted in different computers according to system capacity, and a solution can be applied without the need for a high-capacity GPU.

Yet another object of the present invention is that the image processing method used does not contain human elements and it provides image processing without preprocessing. Thus, it enables the opportunity to detect the threatening object in an image in a much shorter period of time.

Yet another object of the present invention is to use fine-tuned VGG-16, which only uses the classification feature in object presence detection. Thus, it can confirm the presence of the object without detecting the location of the object (faster detection) and following this, faster detection is enabled with the yolo-v2 model using fine tuning/layer reduction.

The structural and characteristic features and all the advantages of the present invention shall be more clearly understood by means of the following FIGURES and the detailed description written by making references to said FIGURES. Therefore, the respective evaluation should be conducted by taking these FIGURES and the detailed description into consideration.

DESCRIPTION OF THE FIGURES

FIG. 1; illustrates the flow diagram of the detection method subject to the invention.

REFERENCE NUMERALS

101. Obtaining a thermal image and carrying out preprocessing to the image via a computer
102. Processing of the image by the computer, using the weapon detection model
103. Detection of the presence of the weapon in the image following computer processing
104. Asking the preference of showing the location of the weapon to the user
105. Showing to the user that there is a weapon present in the processed image on the screen
106. Processing the image by the computer using the location determination model and determining the location of the weapon in the image
107. Showing to the user, the location of the weapon in the image processed, using a screen

108. Recording of the confidence index via the image that has been processed

109. Comparing the confidence index value to the threshold value by the computer

110. Generating an alarm by the computer if the confidence index value is higher than the threshold value

DESCRIPTION OF THE INVENTION

The weapon concealed on a person is detected by using thermal camera images according to the detection method of the invention which uses different deep learning methods that is a sub branch of the artificial intelligence available in a computer.

The detection method, in general terms, processes the images obtained via the thermal camera in real time, following this by uploading these images into two different deep learning models, it is determined whether or not the person is concealing a weapon, and if so, where the weapon is concealed on the person. A configurative counter is kept as of the moment the weapon is detected, and if a weapon is detected during the time duration of this counter in the image stream, an alarm is triggered. This alarm is then sent to the API (Application Programmable Interface) interfaces provided by law enforcement and central security management, and it can be instantly sent if both law enforcement and central security management systems exist.

The method subject of the invention, which can operate with a thermal camera and a computer supported by GPU (Graphic processor unit), involves some processing steps in order for it to operate. If these process steps are to be detailed, first of all, the thermal image is obtained from the thermal camera and the image is preprocessed (101) by the computer. The computer processes (102) the image using the weapon detection model. The computer detects (103) the presence of a weapon in the image as a result of processing. Artificial intelligence and deep learning models are used in the detection process. Thereby, weapon detection is carried out automatically without user supervision and if necessary, the user is informed of this situation. If the weapon is not detected, the image is awaited from the thermal camera to process the next image. The preference of showing the location of the weapon is asked (104) to the user. If the user does not want the location of the weapon to be shown, the warning that there is a weapon in the processed image is displayed (105) on the screen. If the user requests the location of the weapon to be displayed, the computer processes the image using the localization model and determines (106) the location of the weapon in the image. Artificial intelligence and deep learning models are used in the processes of determining the location. Following this, the location of the weapon in the processed image is shown (107) to the user on the screen.

The computer records (108) the confidence index based on the processed image. This record can be a database on a computer or a database on a remote server. The confidence index value is compared (109) with the threshold value by the computer. The threshold value that has been previously saved in the computer's database is available here. This value is used to determine whether the type of object on the user is a weapon or something else. If the confidence index value is higher than the threshold value after comparison, a computer alarm is generated (110). If the confidence index value is less than the threshold value, an image is awaited from the thermal camera to process the next image.

After the alarm is generated, it can optionally be transmitted to the alarm control center or the law enforcement notification center. This alarm can be transmitted in audio, visual or written form.

In order for the computer to detect (103) the presence of a weapon in the image as a result of processing, first of all the weapon is detected by using two different deep learning models. If a weapon is present, its location is determined and shown. The two models can be used independently or complementary to each other. While the models in the state of the art used for object detection in real-time images can capture 3-5 fps (frame per second), in the experiments, the first model of the method that is the subject of the invention, which detects weapons, can provide detection in 5 ms. The second model, which shows the location of the weapon, can provide location detection in less than 1 second. With this optimization, the processed image sizes are reduced, the images are processed with 8 bits, some layers are removed on the models and speed optimization is achieved.

In models used in detection methods in the state of the art, the processing starts with the thermal sensor, following image equalization, pixel mapping and motion detection, the human, and contouring (this can be called object suggestion) are presented. Although the number of steps in the internal operation is very high, it takes 3-4 seconds to determine whether there is a weapon or object concealed in the moving image in the video of the solution. On the other hand, in the model used by the method subject to the invention, every picture taken is processed instantaneously, and the pictures are not processed in the sensor or afterwards, except for size reduction. Without the use of additional steps such as motion detection or human detection, the VGG-16 model, which is a convolutional neural network (CNN) model, is used with added layers at the first stage, and the computer detects whether there is a weapon in the picture and can provide instantaneous output (weapon present/absent) within 10 ms if there is a weapon. When we look at the general flow, this step is sufficient for the detection of an object with threat risk, without applying additional processing in the live image. The system administrator can only perform the steps to determine whether a weapon is present by means of the configuration, and then the administrator can take action on the suspicious person.

The detection (103) of the presence of a weapon in the image as a result of the processing of the method subject to the invention is mainly based on deep learning, and in the first step, only if a weapon is present or not is determined by a convolutional neural network model. During the processing of the image by the computer using the location determination model, and in the process of determining the location (106) of the weapon in the image, the estimated coordinates of the weapon are determined with the Yolo (You look only once) CNN model modified with fine-tuning for location detection. This model, unlike the architectures of the methods used in the state of the art, processes the whole picture at once and presents potential object suggestions and shows suggestions according to an adjusted confidence index. In the process carried out with this model, the picture was only reduced in size and no preprocessing was performed.

In addition, in the second stage, which shows the location of the weapon, the object is (gun, knife) can be identified. The reason for using the Yolo model for object location detection is that it is the most successful alternative for object detection among existing deep learning solutions. The detection times of different deep learning models of the method of the invention were compared in the experimental stages (Masked RCNN, SSD, Yolo V2-V3, Tiny Yolo) and among these alternatives, the Yolo V2 model, which can provide simultaneous detection under 1 second, was selected. The display format can be presented with the probability of the accuracy of the prediction made by artificial intelligence, and it moves with it as the object moves in real time.

In the method of the invention, the deep learning models that detect whether a weapon is present or not and that determine the location of the weapon can be recorded in universal formats such as json/h5 and it can be integrated with a mobile phone. Recordings can be saved in the storage of this device or in a database on a remote server. In the mobile application of the method of the invention, the image obtained from the compact thermal cameras attached to the phone can be processed with a mobile device and the detection of dangerous objects such as guns/knives can also be achieved with a portable device. These portable devices can be any type of portable device that includes a processor, screen, camera and GPU, such as computers, phones, tablets, smart watches, smart glasses etc.

With the method of the invention, weapon detection can be carried out without any radiation or radio wave contact with the human body, such as any x-ray or magnetic wave. As a result it can be installed anywhere as a mobile system with a thermal camera and a GPU supported computer. The detection system and method, which is the subject of the invention, can be installed and used instead of the x-ray devices at the entrances of buildings where weapon control is constantly performed, such as Police Departments, Airports, and Courthouses. When a person who has concealed a weapon on his waist enters the building, the snapshots obtained with the thermal camera are transferred to the deep learning models and they first detect whether a weapon is present or not and if a weapon is present the law enforcement officer in charge can be warned with the warning mechanism and the person posing a threat can be stopped.

In one embodiment of the method subject to the invention, the method can be used with devices such as an IHA (Unmanned Aerial Vehicle)/SIHA (Armed Unmanned Aerial Vehicle) that detects dangerous objects from the air. UAVs that carry out detection especially in regions where terrorist attacks are high, can detect weapons without human intervention, if these solutions are integrated with thermal and zoom cameras.

If a weapon or object is concealed on the body, in one embodiment of the method subject of the invention, which first detects the weapon and then determines its location, the type of object is determined by image processing and artificial intelligence methods by carrying out deep learning on the thermal image map. As a result, without human supervision, an alarm can be triggered and independent observation can be provided. In addition to this, real-time images can be processed with one or more thermal cameras. Similarly, two different deep learning models can work in parallel with each other or independent from each other.

In an embodiment of the method subject to the invention, by devices with weaker graphics processors the type of the object concealed on the person is reported in writing and its location is shown by using only one deep learning model which is multitasked for detecting the concealed object and its location. This configurative option reduces the processing load on the computer and provides flexibility to the organization that uses it. Similarly, flexibility of use is provided by the ability to detect the presence of the weapon or the relevant object or to determine its location and to generate a threat-related alarm accordingly.

The invention claimed is:

1. A computer-implemented method of detecting objects concealed on a person using thermal camera images, the computer-implemented method comprising:

obtaining a single thermal image and performing pre-processing on the single thermal image by the computer;

processing the pre-processed single thermal image by the computer, using a weapon detection model that automatically detects whether a weapon is present or absent in the pre-processed single thermal image, without user supervision, human detection or motion detection, wherein the weapon detection model is an artificial intelligence VGG-16 model that is a convolutional neural network (CNN) based on a deep learning model, with added layers, and does not include motion detection or human detection;

when the weapon detection model automatically detects that a weapon is present in the pre-processed single thermal image, asking a preference of displaying or not displaying the location of the detected weapon to a user;

when the weapon detection model automatically detects that a weapon is present in the pre-processed single thermal image and the user preference requests that the location of the detected weapon be displayed, performing additional processing on the pre-processed single thermal image with the weapon present by the computer using a location determination model, wherein the location determination model is different and separate from the object detection model and wherein the location determination model is an artificial intelligence Yolo (You look only once) CNN model modified by fine tuning for location detection, and displaying on a screen to the user, the location of the detected weapon in the pre-processed single thermal image processed by the location determination model;

when the weapon detection model automatically detects that a weapon is present in the pre-processed single thermal image and the user preference does not request that the location of the weapon be displayed, displaying a warning on the screen that a weapon is present in the processed image and do not perform processing on the pre-processed single thermal image using the weapon location model;

when the weapon detection model automatically detects that a weapon is present in the pre-processed single thermal image, recording a confidence index value via the pre-processed single thermal image that has been processed, comparing the confidence index value to a threshold value by the computer, generating an alarm by the computer when the confidence index value is higher than the threshold value, and when the confidence index value is lower than the threshold value an image is waited from the thermal camera to process the next image; and when the weapon detection model does not detect a weapon in the single thermal image obtained by the computer, the computer waits for a new image from the thermal camera.

2. The method of claim 1, wherein the confidence index is recorded to a database that resides on the computer.

3. The method of claim 1, wherein the confidence index is recorded in a database that resides on a remote server.

4. The method of claim 1, wherein the threshold value has been recorded in a database prior to the comparison with the confidence index value.

5. The method of claim 1, wherein the computer comprises a processor, a screen, a camera, and a graphic processing unit.

6. The method of claim 1, wherein the computer is a mobile device comprising a phone, a tablet, a smart watch, or glasses.

\* \* \* \* \*